(No Model.)

W. CAZIER.
DRAFT EQUALIZER.

No. 386,962. Patented July 31, 1888.

WITNESSES:
W. R. David
C. Sedgwick

INVENTOR:
W. Cazier
BY Munn & Co
ATTORNEYS.

UNITED STATES PATENT OFFICE.

WILLIAM CAZIER, OF WAVELAND, KANSAS.

DRAFT-EQUALIZER.

SPECIFICATION forming part of Letters Patent No. 386,962, dated July 31, 1888.

Application filed January 19, 1888. Serial No. 261,286. (No model.)

*To all whom it may concern:*

Be it known that I, WILLIAM CAZIER, of Waveland, in the county of Shawnee and State of Kansas, have invented a new and Improved Draft-Equalizer, of which the following is a full, clear, and exact description.

This invention relates to draft-equalizers, the object of the invention being to equally distribute the strain upon all of the animals when three animals are attached to the vehicle or plow in connection with which the equalizer is employed.

Reference is to be had to the accompanying drawings, forming a part of this specification, in which similar figures of reference indicate corresponding parts in both the views.

Figure 1:
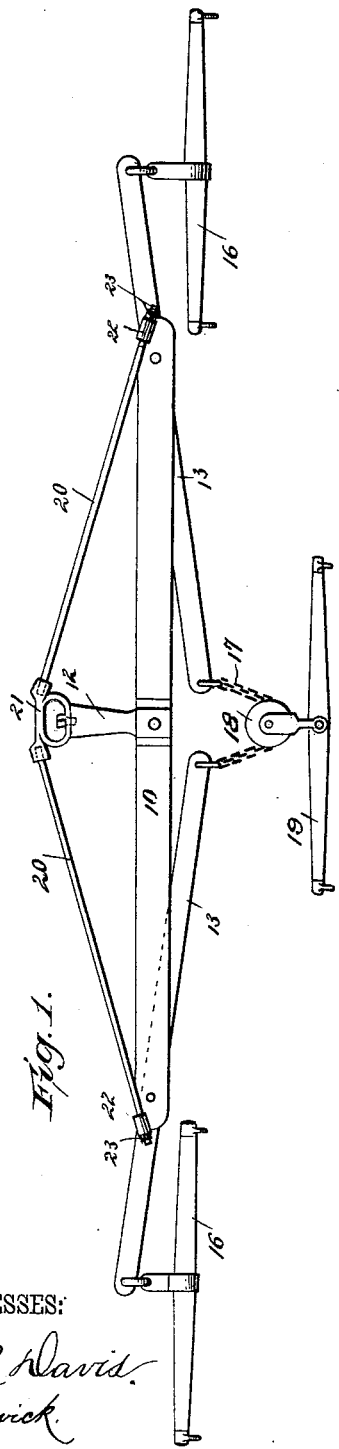
Figure 2:
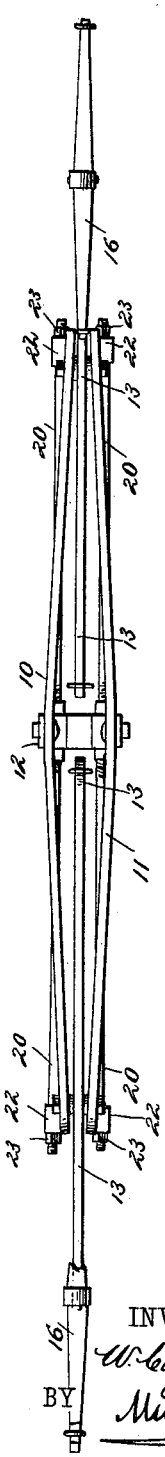

Figure 1 is a plan view of my improved equalizer; and Fig. 2 is a face view thereof, the central singletree, however, being removed.

In constructing the equalizer forming the subject-matter of this application I provide two central bars, 10 and 11, which are centrally spaced and connected by a bracket, 12. Between the ends of the bars 10 and 11 I pivotally mount doubletrees 13, the pivot pins or bolts passing through said doubletrees at points about one-third of the length of said trees inward from the outer ends thereof. To the outer ends of the doubletrees I connect singletrees 16, while to the inner ends I connect a chain, 17, which passes about a sheave, 18, said sheave being in turn connected to a singletree, 19, to which the middle animal is connected, the draft of said middle animal being thus distributed equally upon two doubletrees, the actual draft upon each doubletree being equal to one-half of the draft of the outer animals, and as the inner lengths of the doubletrees 13 are twice as long as the outer lengths of said trees, the draft upon all of the animals will be equalized.

In order to stiffen and strenghten the bars 10 and 11, I connect stay-rods 20 to each end thereof, the approaching ends of said bars being connected to an attachment, 21, that is carried by the bracket 12, while the connection between the bars 10 and 11 and the said rods is established by means of eyes 22 and nuts 23, the eyes being preferably swiveled to the bars, whereby all slack may be taken up.

This equalizer is attached to the plow, implement, or vehicle in connection with which it is to be employed, in the ordinary manner, and from its peculiar construction it will be seen that draft-animals will be held very close to the plow, implement, or vehicle.

Having thus fully described my invention, I claim as new and desire to secure by Letters Patent—

1. In a draft-equalizer, the combination, with a supporting-frame, of doubletrees pivoted to the ends of the said frame at points about one-third of their length inward from the outer ends, singletrees connected to the outer ends of the doubletrees, a chain connected to the inner ends of the said doubletrees, and a central singletree provided with a sheave, around which passes the said chain, substantially as described.

2. In a draft-equalizer, the combination, with the spaced bars 10 and 11, of the doubletrees 13, pivoted between the ends of the said bars, the singletrees 16, connected to the outer ends of the doubletrees, the chain 17, connected to the inner ends of the said doubletrees, and the central singletree, 19, provided with the sheave 18, around which the chain 17 passes, substantially as herein shown and described.

3. In a draft-equalizer, the combination, with a frame consisting of upper and lower bars, as 10 and 11, and braces, as 20, of doubletrees 13, pivotally connected to said frame, singletrees connected to the outer ends of the double-trees, a chain connected to the approaching ends of the doubletrees, a sheave, 18, about which the chain passes, and a singletree connected to the sheave, substantially as described.

WILLIAM CAZIER.

Witnesses:
JAS. D. CARRIGER,
WM. A. CARRIGER.